(12) United States Patent
Barrack et al.

(10) Patent No.: US 7,486,688 B2
(45) Date of Patent: Feb. 3, 2009

(54) COMPACT PACKET SWITCHING NODE STORAGE ARCHITECTURE EMPLOYING DOUBLE DATA RATE SYNCHRONOUS DYNAMIC RAM

(75) Inventors: Craig Barrack, Irvine, CA (US); Yeong Wang, Orange, CA (US); Rong-Feng Chang, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 912 days.

(21) Appl. No.: 10/812,141

(22) Filed: Mar. 29, 2004

(65) Prior Publication Data

US 2005/0213571 A1    Sep. 29, 2005

(51) Int. Cl.
 *H04L 12/28* (2006.01)
(52) U.S. Cl. .................. 370/412; 711/158; 711/150
(58) Field of Classification Search .............. 711/158, 711/150
See application file for complete search history.

(56) References Cited

U.S. PATENT DOCUMENTS

| | | | | |
|---|---|---|---|---|
| 6,006,303 | A * | 12/1999 | Barnaby et al. ............. | 710/244 |
| 6,598,132 | B2 * | 7/2003 | Tran et al. ................... | 711/154 |
| 6,667,744 | B2 * | 12/2003 | Buckelew et al. ........... | 345/502 |
| 6,912,612 | B2 * | 6/2005 | Kapur et al. ................. | 710/309 |
| 7,215,666 | B1 * | 5/2007 | Beshai et al. ................ | 370/380 |
| 2003/0177320 | A1 * | 9/2003 | Sah et al. ..................... | 711/158 |
| 2004/0022094 | A1 * | 2/2004 | Radhakrishnan et al. .... | 365/200 |
| 2004/0120349 | A1 * | 6/2004 | Border et al. ................ | 370/474 |
| 2004/0199729 | A1 * | 10/2004 | Ross ........................... | 711/150 |
| 2005/0240745 | A1 * | 10/2005 | Iyer et al. .................... | 711/167 |

OTHER PUBLICATIONS

A 110 nm 512 Mb DDR DRAM with vertical transistor trench cell Wuensche, S.; VLSI Circuits Digest of Technical Papers, 2002. Symposium on Jun. 13-15, 2002 pp. 114-115.*

(Continued)

*Primary Examiner*—Thong H Vu
(74) *Attorney, Agent, or Firm*—Thomas, Kayden, Horstemeyer & Risley LLP

(57) ABSTRACT

A two-chip/single-die switch architecture and a method for accessing a DDR SDRAM memory store in a switching environment are presented. The two-chip/single-die architecture includes an internal memory storage block on the single-die, an external memory storage interface to a Double Data Rate Synchronous Dynamic Random Access Memory (DDR SDRAM), an external memory manager, and a packet data transfer engine effecting packet data transfers between an internal memory store and the external DDR SDRAM memory. The packet data transfer engine operates as an adaptation layer addressing issues related to employing appropriate: addressing schemes, granule sizes, memory transfer burst sizes, access timing, etc. The packet data transfer engine includes a minimal number of dual mode operational blocks such as: a queue manager, and adaptation receive and transmit blocks. The method relates to a packet data transfer discipline addressing random memory access latencies incurred in employing DDR SDRAM, using predictive bank switching to hide random access latencies, packet length dependent variable memory write burst lengths to minimize bank switching, and performing memory read and write operations during corresponding read and write windows. Advantages are derived from the a space-efficient two-chip/single-die switching node architecture implemented with a reduced amount of dual mode logic, and also from DDR SDRAM bandwidth utilization efficiencies.

20 Claims, 4 Drawing Sheets

OTHER PUBLICATIONS

Design of the high-speed, high-precision and large-scale data acquisition system Hou Xiaomin; Wang Xiaohong; Long Teng; Signal Processing, 2004. Proceedings. ICSP '04. 2004 7th International Conference on vol. 1, Aug. 31-Sep. 4, 2004 pp. 563-566 vol. 1.*

Adaptable ferroelectric memories for space applications Kamp, D.A.; DeVilbiss, A.D.; Philpy, S.C.; Derbenwick, G.F.; Non-Volatile Memory Technology Symposium, 2004 Nov. 15-17, 2004 pp. 149-152.*

Micron Technology, Inc.; "Double Data Rate (DDR) SDRAM" Product Specification; 2003; pp. 1-83; Micron Technology, Inc.; Boise, Idaho, USA.

* cited by examiner

COMPACT PACKET SWITCHING NODE STORAGE ARCHITECTURE EMPLOYING DOUBLE DATA RATE SYNCHRONOUS DYNAMIC RAM

FIELD OF THE INVENTION

The invention relates to storage of packets at a packet switching node, and in particular to methods and apparatus for storing packets at a single-chip packet switching node.

BACKGROUND OF THE INVENTION

In the field of packet-switched communications, switching communications network nodes employ a store-and-forward discipline in processing packets conveyed. Storing packets at the switching network node is performed in accordance with a packet storage discipline and requires memory data storage.

The amount of storage memory required to store packets at a switching node is related to the network environment in which the switching node is employed.

For a switching node employed in a Local Area Network (LAN), typically the total bandwidth available to convey packets in and out of the switching node far exceeds the switching capacity of the switching node, therefore only a small amount of memory storage is required to store packets pending a processing response at the switching node.

By contrast, for access switching network nodes which aggregate uplink traffic and deaggregate downlink traffic, the speed mismatch between access ports (typically 100 Mbps or less) and the uplink ports (1 Gbps or more) often creates temporary congestion conditions at, and data accumulation in, the access switching nodes, requiring switching architecture designs supporting much larger memory stores to prevent packet drops.

Also, for a transport switching network node at the core of a Metropolitan Area Network (MAN), like that of Boston or New York City, the concurrent conveyance of millions of independent traffic flows causes random fluctuations in memory storage occupancy over time. A large packet memory storage is therefore required to withstand any erratic variations in content throughput.

In designing an single-chip switching network node architecture, a system architect takes into consideration the network environment in which the designed switching network node will ultimately be placed, and therefore knows approximately how much packet memory storage is needed. A single-chip switch network node having a large memory storage may cost an additional $30 or more. Therefore, it is essential that the single-chip switching node manufacturer offer solutions that specifically meet varied customers' needs, as opposed to providing a "one-size fits-all" solution because, the customer is just as likely to reject a switching node device with too much memory because of the price tag, as would be to reject a switching node device with too little memory because of a lack of performance.

Therefore, to remain competitive in multiple markets, a switching node system manufacturer typically provides at least two solutions: a switching node device with a small packet memory typically embedded on the single-chip switch, and another switching node device with a large packet memory connected externally. Although designing and fabricating chips for two switching node devices intended for different market segments is good in the sense that small packet storage memory issues are addressed in respect of the former solution only, and large packet storage memory issues are addressed in respect of the later solution only; providing two independent solutions incurs high development costs. The differential cost of fabricating two different switching nodes, instead of one, is high—currently estimated at an additional half of a million dollars. Additionally, the engineering costs for both pre-fabrication (layout, routing, etc.) and post-fabrication (validation) are also doubled.

Because of market drivers in the communications and semiconductor industries, switching node manufacturers are under pressure to cut costs wherever possible. One method of cutting cost in designing embedded packet switching nodes is to fabricate a single die supporting in addition to the switching logic, both, a small embedded memory store, and an option for connecting a large external memory store thereto. A few switching node manufacturers have already applied this "two switching chips, one die" technique in which both the small memory store switching node logic and the large memory storage switching node logic are co-manufactured on the same die.

FIG. 1 illustrates a typical two-chips/single-die switch architecture 100/200.

Accordingly, a first packet data flow for a generic packet switch 100 portion on the single-die employing a small internal memory store 102 (module) is shown. Packets are received via physical links 104 by a Media Access Control (MAC)/Gigabit MAC (GMAC) block 106, in accordance with the Institute of Electrical and Electronics Engineers (IEEE) 802.3 standard, specification which is incorporated herein by reference. A packet reception block 108 transfers the packet data from the MAC block 106 into the internal memory store 102 via an internal memory interface 103. The internal memory store 102 is a small, typically not greater than 1 MB; and fast, typically embedded Static Random Access Memory (SRAM).

Typical Ethernet packet frames vary in size between 64 and 1518 bytes. The internal memory store 102 is subdivided into smaller memory storage regions, referred to herein as granules. In most implementations, each granule is much smaller than the largest packet frame. Packets exceeding the length of a single granule are stored in multiple granules linked together using linking data structures tracked by a internal memory manager block 110. The internal memory manager block 110 maintains a list of free granules in the internal memory store 102, which are requested for use one-by-one by the packet reception block 108 as new packets arrive.

Once a valid packet has been fully written to the internal memory block 102, the packet is said to be pending processing and a packet processing job request is sent to a packet processing block 112. Simply put, the packet processing block 112 implements packet switching. The packet processing block 112 takes as input the first portion of the packet, known as the packet header, typically the first 128 bytes or less; extracts packet header information from packet header fields, and then uses the extracted information to determine the packet's processing priority and at least one destination port 106 via which the packet is to be transmitted out of the switching network node 100.

In addition, the packet may need to be modified based on the classification results; examples include source and/or destination address replacement, Type Of Service (TOS) reassignment, decrementing a packet's Time To Live (TTL) value, and checksum recalculation for the Internet Protocol (IP), the Transport Control Protocol (TCP), or the User Datagram Protocol (UDP). The packet modification function requires additional memory access 114 to the internal memory store 102.

After a packet has been classified, and a destination port determined, a queue manager 116 inserts a corresponding packet transmission job request into a correct forwarding queue—typically one queue per destination port and priority pair (not shown). Each packet is scheduled for transmission when the intended output port 106 is idle, and a job for the packet is waiting in one of that port's queues. Some packets may have to be broadcasted via multiple ports 106. In a switching network node 100 that guarantees Quality-of-Service (QoS), a scheduler (associated with the queue manager module 116) selects the next packet to be transmitted among waiting packet transmission jobs by applying a scheduling algorithm (described elsewhere) that takes into account factors such as packet forwarding priorities and the delay-sensitivity of the queued packets.

In transmitting a packet scheduled for transmission via a corresponding determined output port 106, the packet is retrieved from the internal memory store 102 by the packet transmission module 118 via the internal memory interface 103, and is transferred to the appropriate port MAC/GMAC 106 (or a CPU interface 120). When the entire packet has been transmitted over the physical link 104, the granules used to store the packet in the internal memory store 102 can be recycled by adding them to the list of free granules maintained by the internal memory manager block 110, for use in storing subsequent incoming packets.

FIG. 1 further illustrates a second packet data flow for a generic packet switch 200 portion on the die employing a large external memory storage 202. Conceptually, the packet data flows are nearly identical, except that interface 203 to the external memory storage 202 is used in storing received packets instead of the internal memory interface 103 to the internal memory store 102. Currently, Double Data Rate Synchronous Dynamic Random Access Memory (DDR SDRAM) is the preferred choice for large external memory storage 202 implementations, because the size-to-cost ratio is most favorable. Support for 128 MB of external memory storage is common in such a switching network node 200.

However, DDR SDRAM is not nearly as efficient as SRAM at transferring packet data. Therefore, a significant amount of jitter buffering at DDR SDRAM ingress and egress is needed to prevent overflows and underruns in the (G)MAC block 106. For this purpose, the SRAM memory block 102 is also employed in the large memory storage configuration/operation and is typically divided into two regions: a receive buffer 222 and a transmit buffer 224, for use in dejittering the DDR SDRAM 202.

It is important to re-emphasize that the architecture depicted in FIG. 1 actually reflects two applications of the single-die architecture. To support both modes of operation, all blocks 108, 110, 112, and 118 operating in accordance with internal memory mode logic, actually have corresponding blocks 208, 210, 212, and 218 operating in accordance with external memory mode logic. Both internal memory mode logic and external memory mode logic are implemented, as hardware logic during manufacturing, on the same die. The two modes of operation have entirely different implementations to enable access to the (internal memory store 102) SRAM and (external memory storage 202) DDR SDRAM memories, typically requiring: two different addressing schemes, two different granule sizes, two different sets of timing constraints, etc.

For example, when the external memory storage 202 is to be used, the packet reception block 108/208 must be able to transfer packet data into internal memory store SRAM 102 while operating in the internal memory mode for dejitter buffering, retrieve the packet data therefrom, and then transfer the packet data to external DDR SDRAM 202 via the external memory interface 203 while operating in the external memory mode. Blocks that must that implement both internal and external memory mode logic are "dual mode" blocks.

As nearly all blocks 108/208, 110/210, 112/212, and 118/218 support dual mode operation, such implementations suffer from: very high development costs, a complicated dual block design prone to errors, block-level verification takes at least twice as long to perform, system-level verification requires more effort, the die size is larger because of the multiple dual logic blocks, and the bigger die size reduces production yields.

There therefore is a need to solve the above mentioned issues.

SUMMARY OF THE INVENTION

In accordance with an aspect of the invention, two-chip/single-die packet switch operating in an internal memory mode in storing packet data of a received packet in an internal memory store, and operating in an external memory mode in storing the packet data in an external memory storage connected to the packet switch is provided. The packet switch includes: A packet reception block includes only internal memory mode logic for storing received the packet data in the internal memory store and for issuing a packet processing job request in respect of the packet stored in the internal memory store. A packet processing block including only internal memory mode logic for performing operations on packet header information and for issuing a packet transmission job request in respect of the processed packet. An external memory storage interface including only external memory mode logic, the external memory storage interface being in communication with the external memory storage. An external memory storage manager block including only external memory mode logic for tracking external memory storage occupancy. And, a packet data transfer engine including both internal and external memory mode logic for conveying the packet data between the internal memory store and the external memory storage interface responsive to the transmission job request.

In accordance with another aspect of the invention, the packet switch further includes an internal memory manager block including only internal memory mode logic for tracking internal memory store occupancy.

In accordance with a further aspect of the invention, the packet data transfer engine further includes: A queue managed block including internal memory mode logic for processing the packet transmission job request and including external memory mode logic for conveying the packet data between the internal memory store and the external memory storage interface. And, receive adaptation block including internal memory mode logic for reading the packet data from the internal memory store and including external memory mode logic for writing the packet data to the external memory storage interface.

In accordance with a further aspect of the invention, the packet data transfer engine is symmetric. The packet switch further includes an internal memory store interface including only internal memory mode logic providing access to the internal memory store. And, the packet data transfer engine further includes a transmit adaptation block including external memory mode logic for reading the packet data from the external memory storage interface and including internal memory mode logic for writing the packet data to the internal memory store via the internal memory store interface.

In accordance with a further aspect of the invention, the packet data transfer engine is asymmetric. The packet switch further includes an internal memory store interface including internal memory mode logic providing access to the internal memory store and external memory mode logic for receiving the packet data from the external memory storage interface.

In accordance with a further aspect of the invention, the packet switch further includes a packet transmission block including only internal memory mode logic for retrieving the packet data from the internal memory store in transmitting the packet via an output port.

In accordance with a further aspect of the invention, the packet processing block further includes one of: a search logic for determining an output port for the packet, and a classification logic for classifying the received packet.

In accordance with a further aspect of the invention, a method of accessing Double Data Rate Synchronous Dynamic Random Access Memory (DDR SDRAM) memory storage employed in a packet switch is provided. The DDR SDRAM memory has a plurality of memory banks for storing packet data of a plurality of packets. The packet data is segmented into variable size burst units. A plurality of burst unit memory write operations are sequenced ensuring that each burst unit memory write operation writes packet data to a memory bank different from the previous burst unit memory write operation. A plurality of burst unit memory read operations are sequenced ensuring that each bust unit memory read operation reads packet data from a memory bank different from the previous burst unit memory read operation. The plurality of sequenced burst unit memory write operations are arranged in a plurality of write windows. The plurality of sequenced bust unit memory read operations are arranged in a plurality of read windows. And, memory access operations are performed interleaving the write windows with the read windows.

In accordance with a further aspect of the invention, in segmenting packet data into variable size burst units, the method further includes segmenting packet data in respect of packets received via a plurality of input switch ports prior to storing the packet data into the memory storage.

In accordance with a further aspect of the invention, in sequencing the plurality of memory burst unit memory write operations, the method further includes preferentially scheduling write burst units corresponding to packets from one of: a packet received via a high bandwidth input port, a high quality-of-service packet, a packet of a particular type of service, an alarm packet, and a signaling packet.

In accordance with a further aspect of the invention, in preferentially scheduling write burst units, the method further includes delaying scheduling of write burst units totaling less than ten memory access cycles long to a single bank.

In accordance with a further aspect of the invention, in sequencing the plurality of memory burst unit memory read operations, the method further includes preferentially scheduling read burst units corresponding to a packet from one of: a packet to be transmitted via a high bandwidth output port, a high quality-of-service packet, a packet of a particular type of service, an alarm packet, and a signaling packet.

In accordance with a further aspect of the invention, in sequencing the plurality of memory burst unit memory read operations, the method further includes delaying scheduling of read burst units corresponding to packets destined to a congested output port.

In accordance with yet another aspect of the invention, in sequencing the plurality of memory burst unit memory read operations, the method further includes delaying scheduling of read burst units totaling less than ten memory access cycles long to a single bank.

Advantages are derived from the a space-efficient single die two chip switching node architecture implemented with a reduced amount of dual mode logic, and also from DDR SDRAM bandwidth utilization efficiencies.

BRIEF DESCRIPTION OF THE DRAWINGS

The features and advantages of the invention will become more apparent from the following detailed description of the exemplary embodiments with reference to the attached diagrams wherein.

It will be noted that in the attached diagrams like features bear similar labels.

DETAILED DESCRIPTION OF THE EXEMPLARY EMBODIMENTS

In accordance with a preferred embodiment, a two-chip/single-die switch architecture supporting both a small, embedded, packet storage memory such as, but not limited to, Synchronous Static Random Access Memory (SSRAM), and a large, externally attached, packet storage memory using Double Data Rate Synchronous Dynamic RAM (DDR SDRAM) is provided with minimal dual-mode logic manufactured on the same-die.

Figure 2:
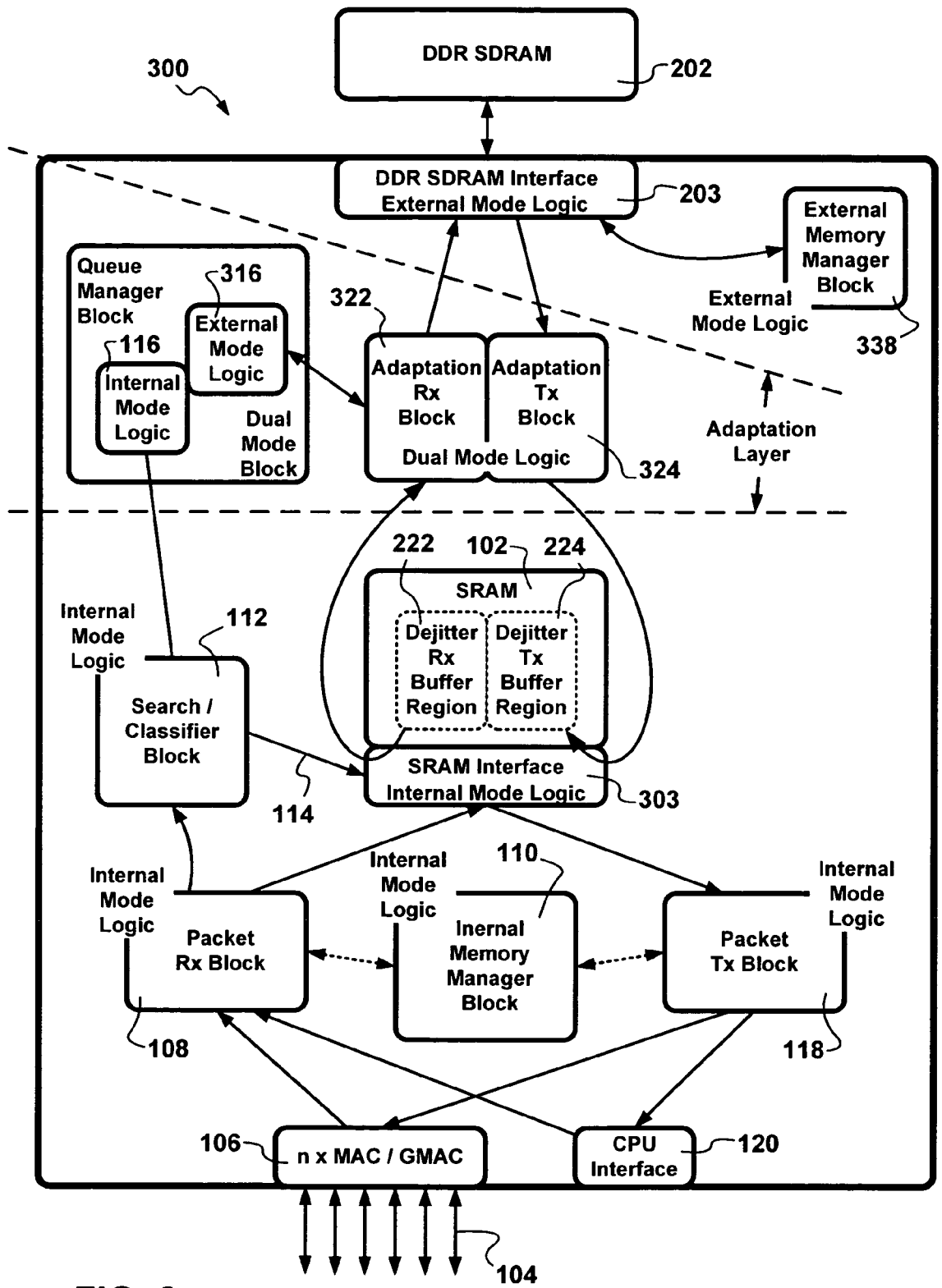
FIG. 2 is a schematic diagram showing elements implementing, in accordance with an exemplary embodiment of the invention, a two-chips/single-die switch architecture.

FIG. 2 is a schematic diagram showing elements implementing, in accordance with an exemplary embodiment of the invention, a two-chips/single-die switch architecture 300 with a large external DDR DSRAM memory storage 202.

In accordance with the exemplary embodiment of the invention, the packet data flow for the packet switch 300 employs blocks 102, 106, 108, 110, 112, 118, and 120 which operate in the single internal memory mode only as described above as if only the internal memory block 102 was employed, whether or not the ultimate location for packet data storage is the internal memory store 102 or the external memory storage 202. The internal memory interface 303 operates in the single internal memory mode. It could be said that blocks 102, 106, 108, 110, 112, 118, 120 and 303 are oblivious to the configuration, small internal memory or the large external memory, in accordance with which the switch 300 operates. The internal memory mode logic operates only in accordance with: the internal memory store addressing scheme, the internal memory store granule size, the internal memory access timing constraints, etc.

External memory mode logic is only employed in accessing the external memory storage 202. The external memory mode logic operates in accordance with: the external memory storage addressing scheme, the external memory storage granule size, the external memory burst sizes in performing packet data transfers, the external memory access timing constraints, etc. In general the external memory granule size is larger than the internal memory granule size. In the following description only details regarding accessing the external memory storage 202 are presented for brevity.

In accordance with the exemplary embodiment of the invention, the queue manager 116/316 is a dual mode block. A packet transmission job for a packet is forwarded to the queue manager. The queue manager employs internal memory mode logic 116 to receive the packet transmission job.

In applying packet filtering to enforce packet acceptance control, if the packet is to be forwarded, then the queue manager 116/316 sends a request to a dual mode reception adaptation block 322, to transfer packet data from the internal memory store 102 to the external memory storage 202. An external memory manager block 338, operating in the external memory mode only, controls the list of free granules for external memory storage 202. It is pointed out that the corresponding internal memory manager 110 operates in the internal memory mode only. The external memory manager block 338 and the external memory storage interface 203 operating in the external memory mode, are oblivious to the operation of the internal memory mode only blocks 102, 106, 108, 110, 112, 118, 120 and 303.

Once the packet has been fully transferred to the external memory storage 202, the queue manager 116/316 inserts the transmission job for the packet into the correct processing queue.

In applying packet filtering to enforce packet acceptance control, the queue manager 116 may drop the packet if switching node resources are low. If the packet is dropped, then no external memory storage access bandwidth will have been used as the packet was only temporarily stored in the internal memory store 102, which represents one of the advantages of the proposed approach. In dropping a packet, internal memory granules employed to store the packet data are added to the free list of internal memory granules maintained by the internal memory manager block 110.

When a packet is scheduled for transmission, the queue manager 116/316 instructs a dual mode transmission adaptation block 324 to transfer packet data from external memory storage 202 back into internal memory store 102.

In accordance with the exemplary embodiment of the invention, only in employing external memory storage 202, a bi-directional packet data transfer engine is used, the bi-directional packet data transfer engine including dual mode blocks: the queue manager 316, the receive adaptation block 322, and the transmit adaptation block 324. Blocks 102, 303, 106, 108, 110, 112, 118, and 120 of the switch 300 operate in the internal memory mode; and blocks 203 and 338 operate in the external memory mode. The bi-directional packet data transfer engine behaves as an adaptation layer, between internal memory store 102 and external memory storage 202, separating single mode blocks operating in the internal and external memory modes. The dual mode adaptation blocks 322 and 324 perform the necessary processing in employing appropriate: memory addressing schemes, storage granule sizes, memory access timing, etc. and concern themselves with external memory transfer burst sizes.

Figure 3:
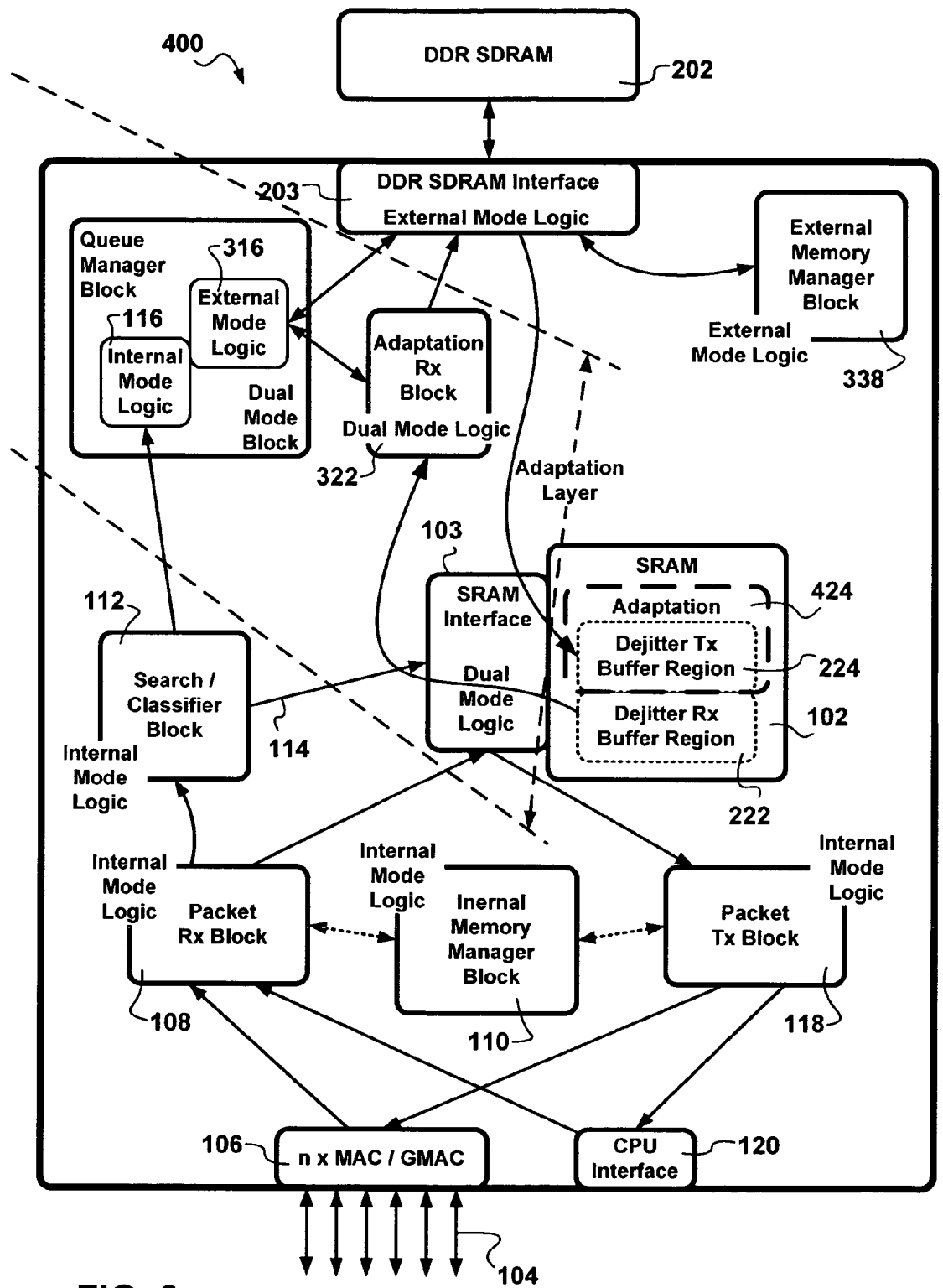
FIG. 3 is another schematic diagram showing elements implementing, in accordance with another exemplary embodiment of the invention, a two-chips/single-die switch architecture.

In accordance with another exemplary embodiment of the invention, a hybrid implementation of a two-chips/single-die switch architecture 400, shown in FIG. 3, includes an asymmetric packet data transfer engine performing asymmetric packet data transfers in and out of the external memory storage 202 employing a dual mode internal memory interface 103.

Figure 1:
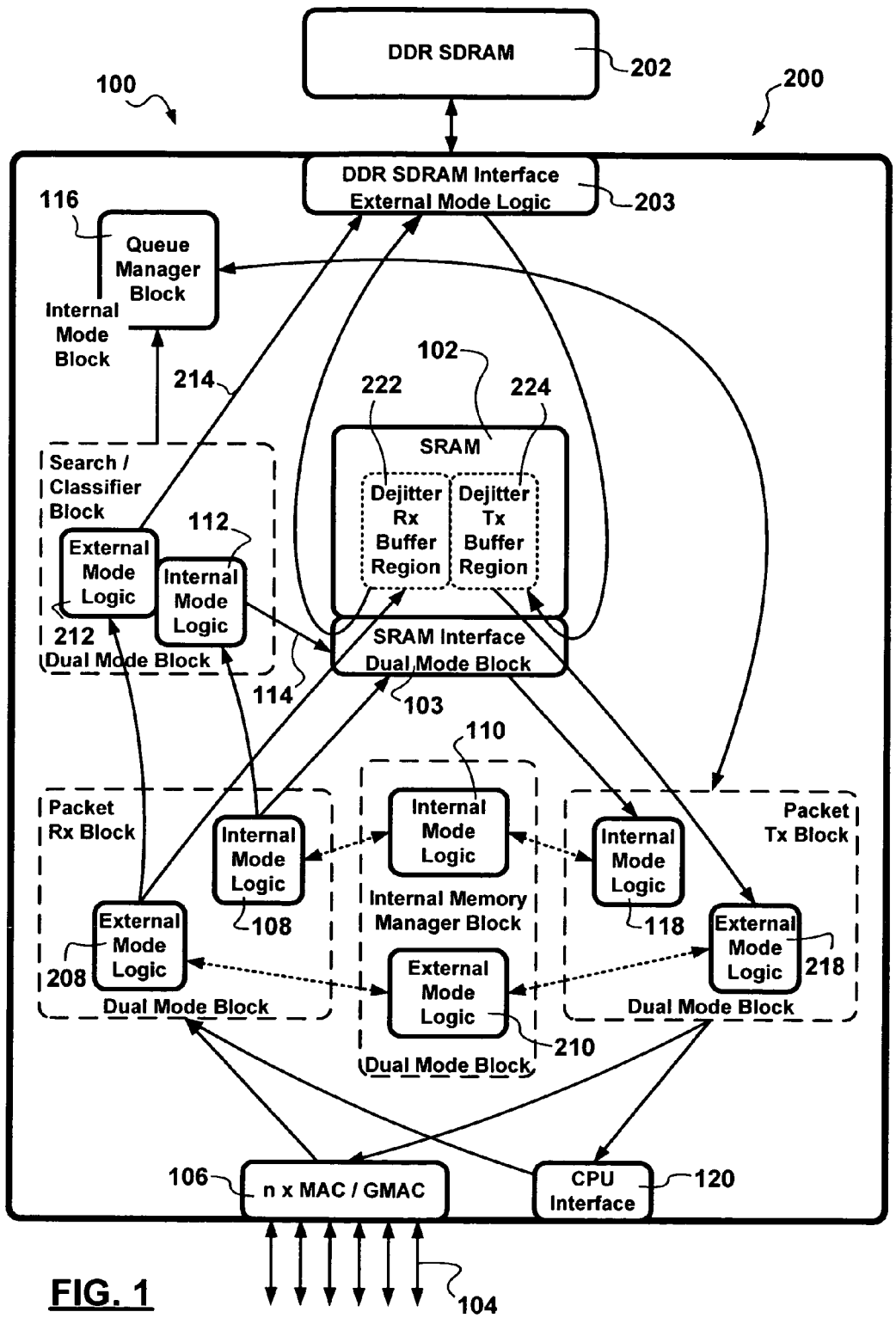
FIG. 1 is a schematic diagram showing elements implementing a typical prior art two-chips/single die switch architecture.

In storing a received packet in the external memory storage 202, the packet data flow from the input port 106 to the external memory interface 203 flows the packet data flow shown in FIG. 2, while the reverse packet data flow from external memory interface 203 to an output port 106 follows the packet data flow shown in FIG. 1. One benefit of the hybrid approach is derived from a reduced internal packet transfer latency, as one stage of the store-and-forward operation is eliminated using the internal memory store 102 as a transmit adaptation block 424; the otherwise storage and retrieval of packet data associated with employing a transmit adaptation block 324 being eliminated. The forwarding latency of the switch 400 is reduced by one packet length transmission time at wire speed. For illustration, the packet transmission latency reduction can be up to 1518 bytes at 100 Mbps, or around 121 microseconds.

Further issues related to packet data bandwidth utilization in employing DDR SDRAM for the external memory storage 202 are presented herein following:

In accordance with the exemplary embodiment of the invention, an exemplary algorithm enabling high bandwidth utilization for a DDR SDRAM implemented external memory storage 202 employed in high-speed (multi-Gigabit-per-second) packet switching environments is provided. Transferring packet data conveyed by n ports 106 to and from the external DDR SDRAM memory storage 202 through the single external memory interface 203 requires careful scheduling in order to ensure storage space and bandwidth efficiency.

Marking reference to FIG. 1, the typical simple approach taken is to write entire received packets to the DDR SDRAM 202 in sequence. In transmitting packets, entire packets would be read out from the DDR SDRAM 202 in sequence. One problem with this simple approach is that, in order to support n ports 106 at full line speed, the packet data transfer bandwidth in accessing the DDR SDRAM 202 must be two times faster than the aggregate port speed of the switch 200. For example, a switch 200 with 24 100 Mbps Ethernet ports 106 must have a memory access bandwidth of 2×24×100 Mbps, or 4.8 Gbps.

As mentioned above, the only way to move an entire packet to the DDR SDRAM 202 at the high rate required, is to temporarily store received packets in their entirety in the dejitter receive buffer 222, and to temporarily store packets scheduled for transmission in their entirety in the dejitter transmit buffer 224. Typically Ethernet frames can be as large as 1518 bytes, but in accordance with a new standard for jumbo Ethernet frames supported by most of the latest packet switches, packet lengths can reach up to 9018 bytes. Therefore, the smallest required dejitter buffer size for writing packets to the DDR SDRAM 202 is 24×9018 bytes. In fact, the actual requirement is doubled, because in servicing the "most unlucky" port 106—the port 106 that is served last assuming a round-robin service discipline at full line rate—will actually require space to store two maximum size packets. The requirement must be doubled again to also allow for DDR SDRAM read at full line rates: 4×24×9018 bytes=865 KB, which is too expensive to manufacture on the single-die as mentioned above.

An improved approach in transferring packet data to the DDR SDRAM external memory storage 202, is to break received packets into small burst units, say 8 or 16 bytes long, and then service packets in round-robin fashion: write 8 bytes of packet data from port 0, write 8 bytes of packet data from port 1, and so on; and then read 8 bytes of packet data for port 0, read 8 bytes of packet data for port 1, and so on. The advantage of the modified approach is that jitter buffering storage space requirements are reduced, saving an enormous amount of memory data storage space. However, from the memory access perspective, write and read operations are now completely random: each memory burst unit is very unlikely to be located "near" the next memory burst unit, because of the shuffling together of small-size memory write and read burst units for the different packets being processed.

Fortunately, the memories 102/202 shown in FIG. 1, FIG. 2, and FIG. 3 are random access memories. The efficiency of random access, however, is dramatically different for different types of memory. For the SRAM 102, small random accesses, either read or write operations, can be packed together in any order, so as to achieve 100% memory access bandwidth utilization without forced "gaps" between consecutive memory accesses. By contrast, in employing DDR SDRAM 202, a significant amount of bandwidth is wasted when sustained memory access includes certain write and read sequences.

Figure 4:
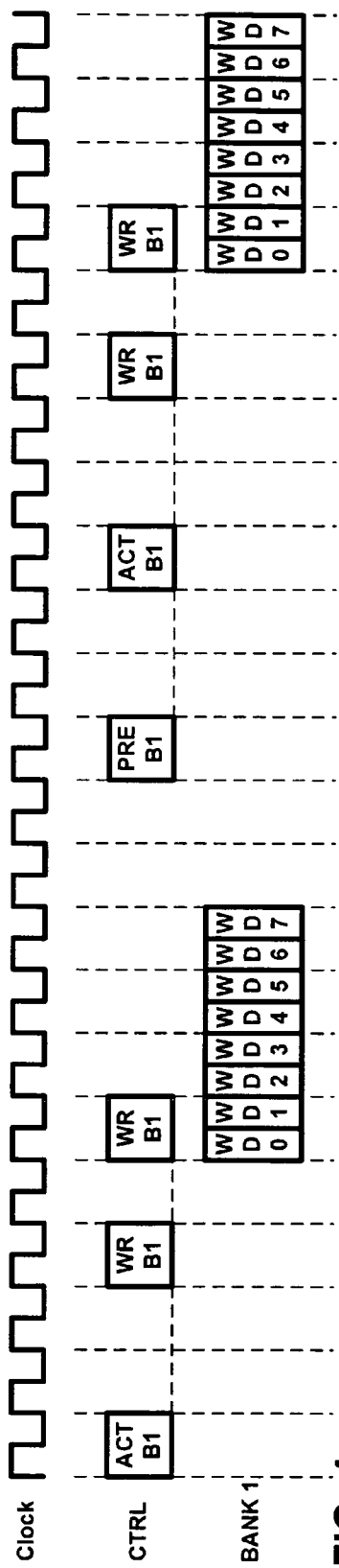
FIG. 4 is a schematic diagram showing a prior art bandwidth inefficient sequential memory write access sequence.

FIG. 4 illustrates a first bandwidth inefficiency problem in employing DDR SDRAM.

A DDR SDRAM memory storage 202 is divided into four memory banks. Memory accesses to the same DDR SDRAM bank with consecutive addresses of a single memory access burst unit can be packed together without loss of memory access bandwidth. A memory write bust unit is exemplary illustrated in FIG. 4 by the first eight consecutive memory write operations to sequential memory addresses WD0 through WD7. In contrast, random memory access to the same DDR SDRAM bank incurs severe bandwidth losses. A large gap is shown in FIG. 4, between the WD7 memory write cycle of the first write burst unit and the WD0 memory write cycle of the second write burst unit caused by an access to a different region of the same memory bank. To perform random write operations, the desired bank must be precharged and reactivated between randomly addressed memory access burst units, causing a long delay.

In high-speed switching applications, wasted memory bandwidth is a critical problem. For example, for a switch 200 supporting an 8 Gbps throughput, at least 16 Gbps of memory bandwidth is required to support simultaneous packet data read and write operations alone. In actual fact, more than 16 Gbps is likely required. First, Ethernet packets may not be "aligned" with the byte width of the memory, causing unavoidable waste during writes (and reads). For example, 65 byte packets require as much memory bandwidth as 80 byte packets, if the width of the data bus is 16 bytes. Therefore, more than 16 Gbps would be required to compensate for at most 15 bytes of waste. Second, in most switch architectures, control information is written to and read from DDR SDRAM memory in addition to the actual packet data. Such control information may include packet length, destination, traffic class information, etc. Reading and writing the additional information also requires additional memory bandwidth. A 64-bit DDR SDRAM 202 running at 166 MHz provides a raw packet data transfer bandwidth of 21 Gbps. If the memory access bandwidth efficiency is only 50% due to latencies incurred in performing random read and write operations, then only a net 10.5 Gbps is available! Typically the only solutions employed to alleviate this problem are to increase the clock frequency and/or to employ a wider bus, neither of which is typically acceptable in practice. Increased clock frequencies lead to signal instabilities in bus lines, and wider data buses require more bus line traces which have to be carefully designed to ensure equal signal propagation times therebetween at minimal cross-talk which grows with the clock frequency and the number of traces employed.

In accordance with the exemplary embodiment of the invention, a predictive algorithm is employed in performing write and read DDR SDRAM memory access operations.

Figure 5:
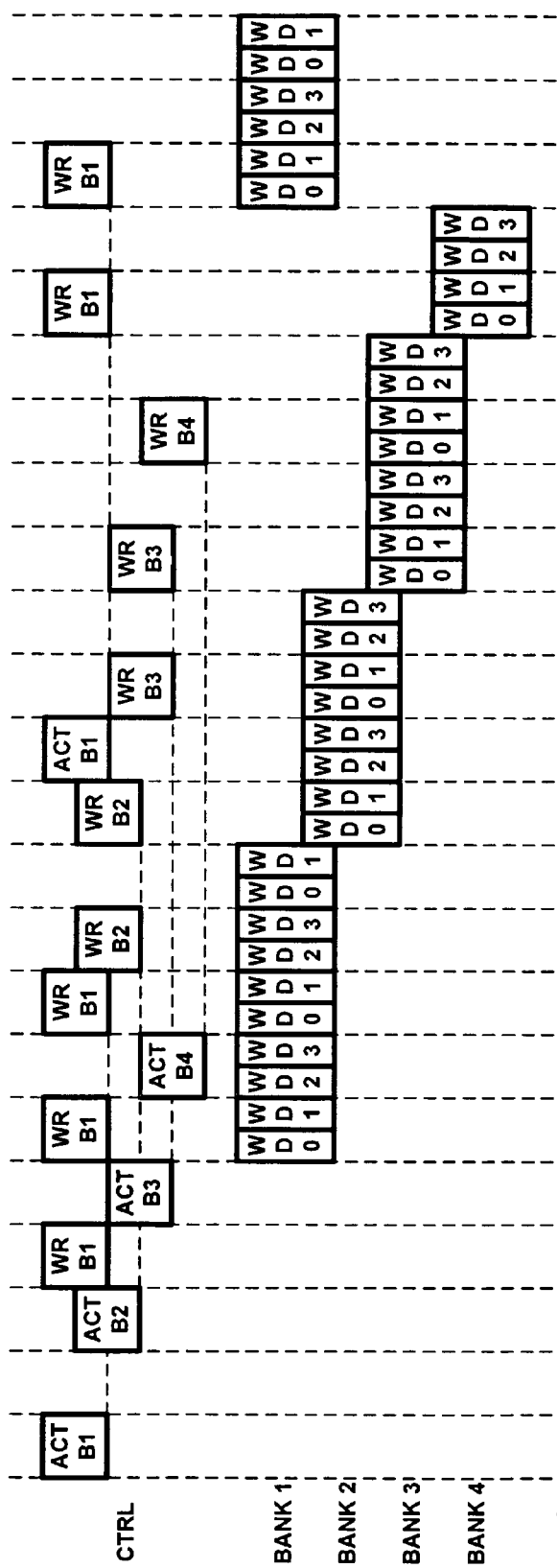
FIG. 5 is a schematic diagram showing, in accordance with the exemplary embodiment of the invention, a memory write access sequence having an improved bandwidth utilization.

FIG. 5 is a schematic diagram showing a multi-bank memory write access sequence having an improved bandwidth utilization. In accordance with the exemplary embodiment of the invention, the delays associated with random access to DDR SDRAM memories can be concealed by alternating access between the four memory banks, also known as pipelining. By employing predictive issuing of precharge and reactivation commands when packet data is written to the DDR SDRAM 202, the write-to address can always be selected so as to use the next-in-order bank of DDR SDRAM 202, resulting in a 100% write efficiency concealing the delays. Note that in order to achieve 100% bandwidth utilization in accessing the DDR SDRAM 202, the bank alternation cannot be performed every read and/or write memory access cycle because the bank precharge and reactivation latencies are too long to be concealed in such a short span of time. Typically each bank access must employ burst units of at least 4 clock memory access cycles in order to hide the entire activation latency and achieve 100% utilization. For example, in accordance with an exemplary DDR SDRAM memory MT46V(64M4/32M8/16M16) manufactured by Micron Technology Inc. 8000 S. Federal Way, P.O. Box 6, Boise, Id. 83707-0006, U.S.A., the specification of which is incorporated herein by reference, requires a gap of at least 10 clock cycles from a memory access to the next memory access to the same bank.

Furthermore, if the memory access width of the external memory store interface 203 is 64 bits, then 64 bytes can be transferred in a 4 cycle burst unit at double data rate. If the worst case scenario, wherein all packets are 65 bytes, persists, then using fixed 64 byte burst units, the last byte of packet data will be written or read by itself, wasting a huge amount of bandwidth.

In accordance with the exemplary embodiment of the invention, burst units have variable sizes. In segmenting packet data into burst units, the following rule may be applied: if there are more than 112 bytes remaining to be written, then the first 64 bytes are sectioned off into a burst unit and are written to the DDR SDRAM 202, otherwise, all 111 remaining bytes, or less, all are written in one burst unit to a single bank of the DDR SDRAM 202. A 113 byte packet will be broken into two burst units of 64 and 49 bytes, respectively, each burst unit requiring 4 memory access cycles to write to alternate banks. A similar rule is followed for read operations. As mentioned above, the external buffer manager 338 tracks DDR SDRAM utilization. Therefore DDR SDRAM 202 burst unit sizes vary between 49 and 112 bytes with a median of 64 byte burst unit size.

In accordance with the exemplary embodiment of the invention, further improvement in bandwidth utilization is achieved by minimizing bank switching when otherwise only short jobs are pending transfer. If currently packet data is being written to one of the memory banks, and pending write transfers for the other three banks do not total at least 10 memory access cycles worth of data to mask the gap, then the current memory write operation should continue writing packet data to the present bank rather than alternating to another bank. Therefore, foreseeing future bandwidth waste, the current write operation continues to burst longer rather than alternating banks.

However, when reading from DDR SDRAM 202, the packet data storage address cannot be selected; after all, the packet data is where it was stored! As the bank alternation was used in storing packet data, the packet data would be read in bank alternating fashion if packets were written and read in their entirety. It is unlikely that packet data is accessed sequentially for entire packets, as mentioned above in respect of minimizing buffering requirements. The order in which packet data is read out cannot be guaranteed, because the read out order depends on a myriad of real-time conditions including but not limited to: traffic congestion levels at different ports, QoS levels for different packets, alarm packets, signaling packets, and so on. Therefore it is possible that during some interval of time, packet data (in respect of multiple packets) being transmitted out is stored in a single DDR SDRAM bank. This represents the worst case scenario as there would be no way to conceal precharge and reactivation latencies during memory read operations through bank alternation.

In accordance with the exemplary embodiment of the invention, instances wherein two sequentially scheduled packet data retrieval burst units from disparate memory locations in the same DDR SDRAM bank are identified, and the order of retrieving the second and subsequent packet data burst units is modified in such a way that no sequential memory read bursts are performed on the same DDR SDRAM bank, enforcing bank alternation to the extent possible. Therefore, in accordance with the exemplary embodiment of the invention, the read access algorithm alternates banks as much as possible and achieve high read efficiency, on average.

The above improvements concern bandwidth efficiencies for sequential read and write operations. There still is an unavoidable bandwidth penalty every time a read follows a write, and vice versa, regardless of the banks on which the operations are performed. In accordance with the exemplary embodiment of the invention, read/write memory access cycles are performed in windows of an exemplary maximum of 128 memory access cycles. If sufficient packet data for read and write operations simultaneously awaits transfer, packet data is transferred in burst units during 128 cycle windows in alternating fashion between write and read operations, or until read or write jobs are exhausted. The actual width of memory access windows will vary because the memory access windows start and end on granule boundaries, and the granule themselves have variable lengths as mentioned above.

The window size is left to design choice. Packing together write and read memory access cycles in a 128 memory access cycle window, wasted bandwidth caused by read/write alternation can be reduced to less than 3%. Shorter windows result in a greater bandwidth waste, whereas employing larger windows requires greater dejitter buffer 222/224 resources.

In the above an implicit assumption prevailed: that all ports 106 operate at the same line rate and that all packet traffic is unclassified. In practice, switching nodes 300/400 employ ports 106 operating at different line rates and the packet traffic falls into a number of traffic classes, each traffic class having a certain level of preferential treatment. In accordance with the exemplary embodiment of the invention, in order to ensure that packet data is conveyed to and from the DDR SDRAM external memory storage 202 quicker for the faster ports, and that certain traffic classes receive preferential treatment, the queue manager 316 preferentially selects packet data to be written to the DDR SDRAM 202 and bank alternation for read operations must be prioritized accordingly. Read requests for each memory bank are divided into multiple priority queues. Higher priority queues are always served before lower priority queues, such that full line rate transmission can be maintained on all ports 106 including the high-speed ports.

The embodiments presented are exemplary only and persons skilled in the art would appreciate that variations to the above described embodiments may be made without departing from the spirit of the invention. The scope of the invention is solely defined by the appended claims.

We claim:

1. A method of accessing Double Data Rate Synchronous Dynamic Random Access Memory (DDR SDRAM) memory storage employed in a packet switch, the DDR SDRAM memory having a plurality of memory banks for storing packet data of a plurality of packets, the method comprising steps of:
   a. segmenting packet data into variable size burst units;
   b. sequencing a plurality of burst unit memory write operations ensuring that each burst unit memory write operation writes packet data to a memory bank different from the previous burst unit memory write operation;
   c. sequencing a plurality of burst unit memory read operations ensuring that each bust unit memory read operation reads packet data from a memory bank different from the previous burst unit memory read operation;
   d. arranging the plurality of sequenced burst unit memory write operations in a plurality of write windows;
   e. arranging the plurality of sequenced bust unit memory read operations in a plurality of read windows; and
   f. performing memory access operations interleaving the write windows with the read windows.

2. The method claimed in claim 1, wherein segmenting packet data into variable size burst units, the method further comprises a step of:
   segmenting packet data in respect of packets received via a plurality of input switch ports prior to storing the packet data into the memory storage.

3. The method claimed in claim 2, further comprising a prior step of: enforcing packet acceptance control.

4. The method claimed in claim 3, wherein enforcing packet acceptance control, the method further comprises a step from: selectively accepting a packet, and selectively discarding another packet.

5. The method claimed in claim 2, wherein sequencing the plurality of memory burst unit memory write operations, the method further comprises a step of:
   preferentially scheduling write burst units corresponding to a packet from one of:
   a packet received via a high bandwidth input port, a high quality-of-service packet, a packet of a particular type of service, an alarm packet, and a signaling packet.

6. The method claimed in claim 5, wherein preferentially scheduling write burst units, the method further comprises a step of:
   delaying scheduling of write burst units totaling less than ten memory access cycles long to a single bank.

7. The method claimed in claim 1, wherein segmenting packet data into variable size burst units, the method further comprises segmenting packet data in respect of packets stored in the memory storage for transmission via a plurality of output switch ports.

8. The method claimed in claim 7, wherein sequencing the plurality of memory burst unit memory read operations, the method further comprises a step of:
   preferentially scheduling read burst units corresponding to packets from one of:
   a packet to be transmitted via a high bandwidth output port, a high quality-of-service packet, a packet of a particular type of service, an alarm packet, and a signaling packet.

9. The method claimed in claim 7, wherein sequencing the plurality of memory burst unit memory read operations, the method further comprises a step of:
   delaying scheduling of read burst units corresponding to packets destined to a congested output port.

10. The method claimed in claim 7, wherein sequencing the plurality of memory burst unit memory read operations, the method further comprises a step of:

delaying scheduling of read burst units totaling less than ten memory access cycles long to a single bank.

11. The method claimed in claim 1, wherein segmenting packet data, the method further comprises a step of: segmenting packet data into at least four memory access cycles long burst units.

12. The method claimed in claim 11, wherein segmenting packet data, the method further comprises a step of: segmenting packet data into burst units transferring at least 49 bytes of packet data.

13. The method claimed in claim 1, further employing windows at least 128 memory access cycles long.

14. A method comprising:

segmenting packet data into variable size burst units based on a predefined rule;

sequencing a plurality of memory write operations such that each memory write operation writes packet data to a memory bank different from the previous memory write operation;

sequencing a plurality of burst unit memory read operations such that each memory read operation reads packet data from a memory bank different from the previous memory read operation;

arranging the plurality of sequenced burst unit memory write operations in a plurality of write windows;

arranging the plurality of sequenced bust unit memory read operations in a plurality of read windows, wherein the windows are at least a predetermined minimum size; and performing memory access operations by interleaving the write windows with the read windows.

15. The method of claim 14, wherein segmenting packet data into variable size burst units based on a predefined rule comprises segmenting packet data such that the burst units are between a predetermined minimum and a predetermined maximum burst unit size.

16. The method of claim 15, wherein segmenting packet data into variable size burst units based on a predefined rule further comprises segmenting packet data such that the burst units have a predetermined median burst unit size.

17. The method of claim 14, wherein the predetermined minimum size is 128 memory access cycles.

18. A system comprising:

means for partitioning packet data, wherein the partitioned packet data size falls between a predetermined minimum and a predetermined maximum burst unit size;

means for arranging burst unit memory write operations, wherein each memory write operation writes packet data to a memory bank different from the previous memory write operation;

means for arranging burst unit memory read operations, wherein each memory read operation reads packet data from a memory bank different from the previous memory read operation;

means for arranging the burst unit memory write operations in a plurality of write windows;

means for arranging the burst unit memory read operations in a plurality of read windows; and means for interleaving the write windows with the read windows to perform memory access operations.

19. The system of claim 18, wherein the windows are at least 128 memory access cycles long.

20. The system of claim 18, wherein the predetermined minimum burst unit size is 49 bytes of packet data.

* * * * *